US009135140B2

(12) United States Patent
Bennah et al.

(10) Patent No.: US 9,135,140 B2
(45) Date of Patent: Sep. 15, 2015

(54) IDENTIFYING SOFTWARE RESPONSIBLE FOR A CHANGE IN SYSTEM STABILITY

(71) Applicant: International Business Machines Corporation, Armonk, NY (US)

(72) Inventors: Albert D. Bennah, Cary, NC (US); Adrian X. Rodriguez, Durham, NC (US); Eric Woods, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 322 days.

(21) Appl. No.: 13/691,026

(22) Filed: Nov. 30, 2012

(65) Prior Publication Data

US 2014/0157056 A1    Jun. 5, 2014

(51) Int. Cl.
| | |
|---|---|
| G06F 21/56 | (2013.01) |
| G06F 11/36 | (2006.01) |
| G06F 9/44 | (2006.01) |
| G06F 11/34 | (2006.01) |
| G06F 9/445 | (2006.01) |

(52) U.S. Cl.
CPC .............. *G06F 11/3604* (2013.01); *G06F 8/00* (2013.01); *G06F 11/34* (2013.01); *G06F 8/60* (2013.01)

(58) Field of Classification Search
CPC ......... G06F 21/56; G06F 21/10; G06F 21/50; G06F 21/604; G06F 21/6218
USPC ........................................................... 714/37
See application file for complete search history.

(56) References Cited

U.S. PATENT DOCUMENTS

| | | | |
|---|---|---|---|
| 7,352,280 B1 | 4/2008 | Rockwood | |
| 7,774,657 B1 | 8/2010 | Hardman | |
| 7,954,008 B2 | 5/2011 | Mahajan et al. | |
| 8,175,863 B1 * | 5/2012 | Ostermeyer et al. | ............ 703/22 |
| 8,209,564 B2 | 6/2012 | Vidal et al. | |
| 2004/0230873 A1 | 11/2004 | Ward | |
| 2010/0037316 A1 * | 2/2010 | Rive et al. | ............ 726/22 |
| 2012/0102569 A1 * | 4/2012 | Turbin | ............ 726/24 |

* cited by examiner

*Primary Examiner* — Jigar Patel
(74) *Attorney, Agent, or Firm* — Katherine S. Brown; Jeffrey L. Streets

(57) ABSTRACT

A computer program product including computer usable program code embodied on a tangible computer usable storage medium, includes: computer usable program code for detecting a stability change in a first computer system; computer usable program code for comparing a first set of software applications installed on the first computer system to each set of software applications installed on a plurality of other computer systems in communication with a management module; computer usable program code for identifying a second computer system from among the plurality of other computer systems, wherein the set of software applications installed on the second computer system includes all of the first set of software applications except for a given software application; and computer usable program code for identifying the given software application as the cause of the stability change in the first computer system.

20 Claims, 7 Drawing Sheets

IDENTIFYING SOFTWARE RESPONSIBLE FOR A CHANGE IN SYSTEM STABILITY

BACKGROUND

1. Field of the Invention

The present invention relates to monitoring and managing the operational stability of a computer system.

2. Background of the Related Art

Physical computer systems and virtual machines rely upon various types and versions of software applications in order to complete their tasks. These software applications may include operating systems, drivers, firmware, and user applications. New and different software applications may be installed into one of these systems or machines from time to time to alter, maintain or update the software capabilities. Ongoing installation of software makes this a potentially dynamic environment. In fact, software package update managers may be utilized to perform routine software updates.

However, the installation of a software application, including a software update, may lead to a system event that impacts the performance of the system. These system events may be referred to as faults, instabilities, or errors. When a systems management tool detects such a failure or instability in a computer system, the systems management tool is capable of triggering the collection and storage of a log. Administrative personnel may then access the log in order to determine the cause of the problem and attempt to fix the problem.

BRIEF SUMMARY

One embodiment of the present invention provides a computer-implemented method, comprising detecting a stability change in a first computer system, and comparing a first set of software applications installed on the first computer system to each set of software applications installed on a plurality of other computer systems in communication with a management module. The method then identifies a second computer system from among the plurality of other computer systems, wherein the set of software applications installed on the second computer system includes all of the first set of software applications except for a given software application. The given software application may accordingly be identified as the cause of the stability change in the first computer system.

Another embodiment of the present invention provides a computer program product including computer usable program code embodied on a tangible computer usable storage medium. The computer program product comprises computer usable program code for detecting a stability change in a first computer system; computer usable program code for comparing a first set of software applications installed on the first computer system to each set of software applications installed on a plurality of other computer systems in communication with a management module; computer usable program code for identifying a second computer system from among the plurality of other computer systems, wherein the set of software applications installed on the second computer system includes all of the first set of software applications except for a given software application; and computer usable program code for identifying the given software application as the cause of the stability change in the first computer system.

DETAILED DESCRIPTION

Figure 1:
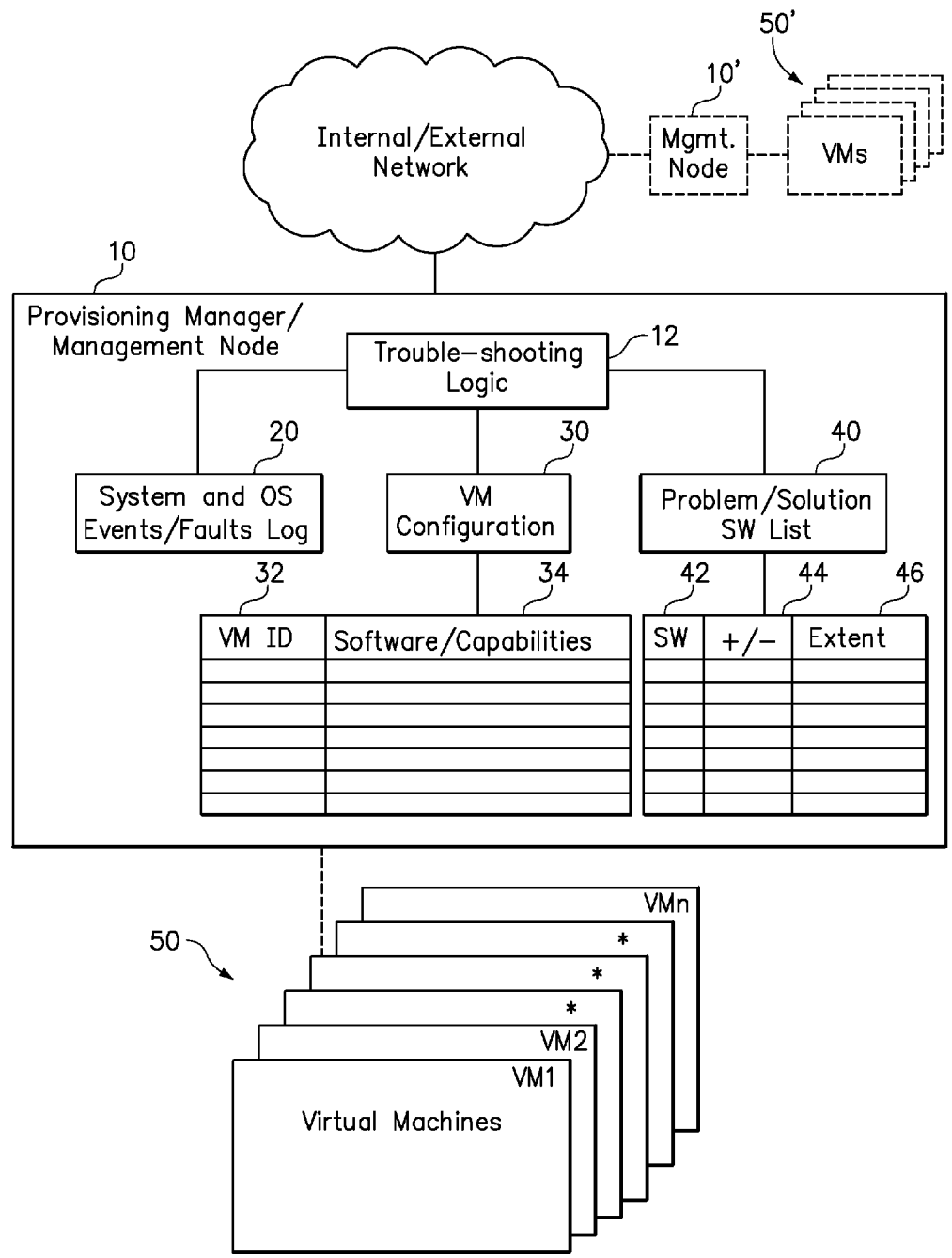
FIG. 1 is a schematic diagram of a management node capable of monitoring the stability of virtual machines.

One embodiment of the present invention provides a computer-implemented method, comprising detecting a stability change in a first computer system, and comparing a first set of software applications installed on the first computer system to each set of software applications installed on a plurality of other computer systems. The method then identifies a second computer system from among the plurality of other computer systems, wherein the set of software applications installed on the second computer system includes all of the first set of software applications except for a given software application. The given software application may accordingly be identified as the cause of the stability change in the first computer system.

In a further embodiment, the first computer system and the plurality of other computer systems are in communication with, and managed by, a management module. A management module may, for example, reside on an individual computer, but may also reside on a management node having a plurality of servers in communication with the management node. The method may further include the management module or node communicating with at least one other management module or node to share data identifying a set of software applications installed on each computer system, wherein each of the at least one other management module or node manages a plurality of computer systems. The management module may be or include a provisioning manager that manages virtual machines. Accordingly, a provisioning manager may maintain a list of software applications that have been identified as the cause of a stability change. Such a list may be used by the provisioning manager to take one or more actions, such as preventing use of an identified software application in additional virtual machines being provisioned, or refusing to accept migration of a virtual machine that uses an identified software application.

The methods of the present invention include a comparison between a first set of software applications installed on the first computer system and a second set of software applications installed on a second computer system, such as where the first and second computer systems are virtual machines. Preferably, the comparison is repeated for a plurality of computer systems in order to identify software applications that are causing a stability change. In one embodiment, the various systems are virtual machines that were provisioned with the same parent template, such that there are typically only a few differences in the software between systems. For example, many virtual machines in a system will vary only in a single software application that is running a workload within the virtual machine. Accordingly, where two virtual machines vary only in a single software application, any difference in stability between the two virtual machines may be attributed to the single software application. By making such comparisons between a large number of virtual machines, the cause of an instability in a particular virtual machine can be identified.

Embodiments of the invention may be used to analyze system stability changes that occur in various types of systems, such as compute nodes, servers and virtual machines. However, because virtual machines are cloned from each other (i.e., are provisioned from the same template), those virtual machines are likely to have identical system configurations except for a particular software application related to the specific workload that the virtual machine is assigned to execute. If the system analyzes two cloned VMs and the first VM exhibits instability and the second VM is stable, the software on the first VM that is not on the second VM is determined to be responsible for the instability. Across a system that manages thousands of VMs, the potential for detecting stability changes and correlating those stability changes to a particular software or software update grows exponentially.

The method may detect a stability change that is either an increase in an amount of stability or an increase in an amount of instability. Existing system management tools are capable of identifying the condition associated with a stability change. Accordingly, a stability change is typically detected by a management node, such as a VM machine manager. Preferably, the method will detect stability changes of both types and identifies software applications that are likely to have caused either stability or instability. A stability change in a computer system may manifest itself as CPU utilization that is greater than a predetermined CPU utilization threshold, network utilization that is less than a predetermined network utilization threshold, or memory utilization that is less than a predetermined memory utilization threshold. A common example of system instability is when a particular software application goes into a "not responding" state. That particular software application is linked to the system freezing and the system's stability change.

The software application that is identified may be an update to a driver or firmware, or an updated version of a previously installed software application. Drivers allow an operating system to interface with various devices of a computer system. A fault or failure of a driver is a likely source of a stability change. Accordingly, the identified software application may include a driver for a hard disk drive, a network interface, or an input/output port. The software application may also be part of a virtual machine or running within a virtual machine.

Having identified a software application that is likely to be responsible for the stability change, the method may further comprise removing the identified software application, presumably if the identified software application was responsible for an increase in instability. Similarly, the method may further comprise installing an updated version of the identified software application, presumably to fix the instability problem. In various embodiments, the updated version would only be installed if the updated version has been shown to increase stability in one or more other computers.

In a further embodiment, the method may include preparing a list of software applications including the name of the identified software application and the whether the stability change caused by the identified software application increases stability or instability. The list may further include some expression of the degree or extent of stability change. A software application that causes a large extent of instability may be removed, updated or be subject to other significant action(s), whereas a software application that caused only a minor extent of instability might be tolerated in situations where there was not available update or work around.

In yet another embodiment, the list of software applications includes software applications that increase stability and software applications that increase instability. Accordingly, each record in the list of software application should include a further indication whether the stability change was an increase in stability or an increase in instability. Over time and across the occurrence of multiple stability changes, the software list may be updated to include software applications, such as updates, that are determined to fix the instability caused by software applications included on the list.

Although the methods of the invention may be implemented on a stand-alone computer system, other embodiments of the method may include informing other computer systems that the identified software application may cause a stability change. Optionally, this may include informing at least one other computer system of the likelihood that the identified software application is the cause of the stability change. This might be done by sending a copy of the foregoing list of software applications that are likely to be responsible for a stability change. In a further option, the list may be broadcast to any computer system that is monitoring for such a list.

In a further embodiments, the method prepares a list of software applications that have been identified as the cause of a stability change in the computer system, and provides the list to at least one other computer system. The other computer system may, in response to receiving the list, avoid installing any of the software applications on the list that cause instability or remove any existing instances of those software applications. However, if the list identifies a software application as increasing stability, then the other computer system may, in response to receiving the list, install one or more such software applications on the list. This may be the case where the software application is an update of a software application already installed on the other computer system.

Still further embodiments of the invention include the sharing of information across multiple networks. Certain forms of information sharing may be considered crowd sourcing. Various entities or individuals may agree to share system health data so that the present methods have a larger amount of data from which to better identify software applications that are responsible for a system stability change. Alternatively, various entities or individuals may separately identify software applications that are responsible for a system stability change, but then may agree to share or publish their "problem list" or "solution list" of software applications.

Embodiments of the invention may be used to analyze system stability changes that occur in various types of systems, such as compute nodes, servers and virtual machines. Across a computer system that manages thousands of VMs, the potential for detecting stability changes and correlating those stability changes to a particular software or software update grows exponentially.

It should be recognized that the methods of the present invention may be performed as a single task, a periodic task according to a schedule, or a continuous task monitoring systems for stability changes and recommending potential fixes. Regardless of when the method is performed, it is not limited to use during a period of software installation. This is a beneficial aspect of embodiment of the invention, since installation of a given software application may be successfully completed, yet cause the system to experience instability when the software application is run. For example, a hard disk drive (HDD) driver may not be recognizable as a bad HDD driver until the HDD driver receives an instruction and causes the system to slow down.

A management node may monitor and store system health metrics over time, including CPU usage, memory usage, and network traffic. When an irregularity is detected, it may be considered an OS event. The methods of the present invention use this stored list of system information across multiple servers or virtual machines in order to pin point the cause of the detected irregularity. Because the stored list of OS events is time-stamped, analysis of multiple servers or virtual machines allows the method to correlate irregularities (changes in stability) to the use of particular software, such as the progressive installation of a software update across the multiple servers or virtual machines in the data center. A management node using the methods of the present invention can distinguish a stability change that is caused by use of a particular software application from a stability change that is caused by a hardware failure. For example, if a network switch were to fail, all of the systems connected to the network switch will simultaneously lose connectivity. A bad network software update will manifest itself only in those systems that have yet received the bad network software update.

Another embodiment of the present invention provides a computer program product including computer usable program code embodied on a tangible computer usable storage medium. The computer program product comprises computer usable program code for detecting a stability change in a first computer system; computer usable program code for comparing a first set of software applications installed on the first computer system to each set of software applications installed on a plurality of other computer systems in communication with a management node; computer usable program code for identifying a second computer system from among the plurality of other computer systems, wherein the set of software applications installed on the second computer system includes all of the first set of software applications except for a given software application; and computer usable program code for identifying the given software application as the cause of the stability change in the first computer system.

The computer program product may further include computer usable program code for executing, initiating or controlling any of the steps of the computer-implemented method described herein.

FIG. 1 is a schematic diagram of a provisioning manager, such as a management node 10, capable of monitoring the stability of a plurality of virtual machines 50. The management node 10 includes trouble-shooting logic 12, which implements aspects of the methods of the present invention. The trouble-shooting logic 12 has access to a System and OS Events/Faults Log 20, Virtual Machine Configuration data 30, and a Problem/Solution Software List 40. The System and OS Events/Faults Log 20 is a list that is maintained by existing system management tools, and provides a source for identifying which virtual machines are experiencing instability.

The Virtual Machine Configuration data 30 includes a Virtual Machine Identification (VM ID; column 32) that specifies one of the virtual machines 50, and a list of the software applications run by each virtual machine and the capabilities of each of those software applications (column 34). The Server Configuration data 30 is maintained by the management node 10, perhaps by populating a record in the Server Configuration data 30 each time that a virtual machine is provisioned by the provisioning manager 10 and each time that a virtual machine is migrated under the control of the provisioning manager 10.

The Problem/Solution Software List 40 is prepared by the trouble-shooting logic 12 and may be shared with other computer systems, such as the management node 10' which manages additional virtual machines 50', in accordance with embodiments of the present invention. Such a list may be shared, for example, over an internal network, such as a local area network (LAN), or an external network, such as the Internet. The Problem/Solution Software List 40 may, for example, include a plurality of records that identify software applications that have been identified as having been the cause of a stability change (column 42), an indication whether the stability change was an increase in stability (+) or an increase in instability (-) (column 44), and an indication of the extent of the stability change (column 46).

Figure 2:
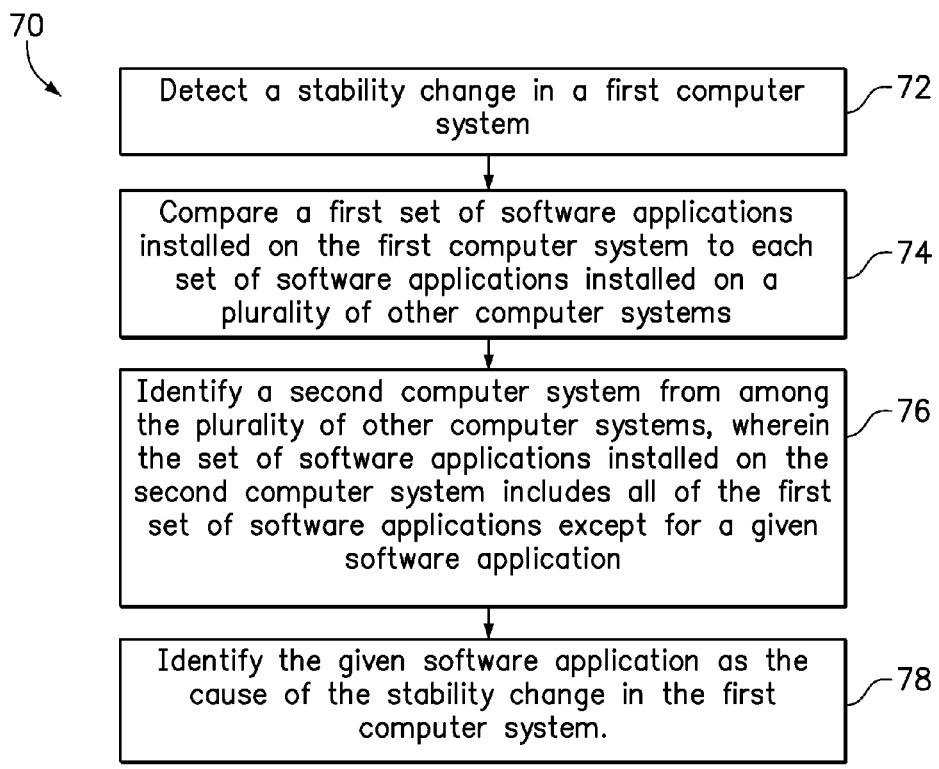
FIG. 2 is a flowchart of a method of identifying software applications that are responsible for system stability changes in one or more of the virtual machines.

FIG. 2 is a flowchart of a method 70 of identifying software applications that are the cause of stability changes in one or more virtual machines or other computer system entities. Step 72 detects a stability change in a first computer system. Step 74 compares a first set of software applications installed on the first computer system to each set of software applications installed on a plurality of other computer systems. Then, in Step 76, the method identifies g a second computer system from among the plurality of other computer systems, wherein the set of software applications installed on the second computer system includes all of the first set of software applications except for a given software application. The given software application is then identified in Step 78 as the cause of the stability change in the first computer system.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
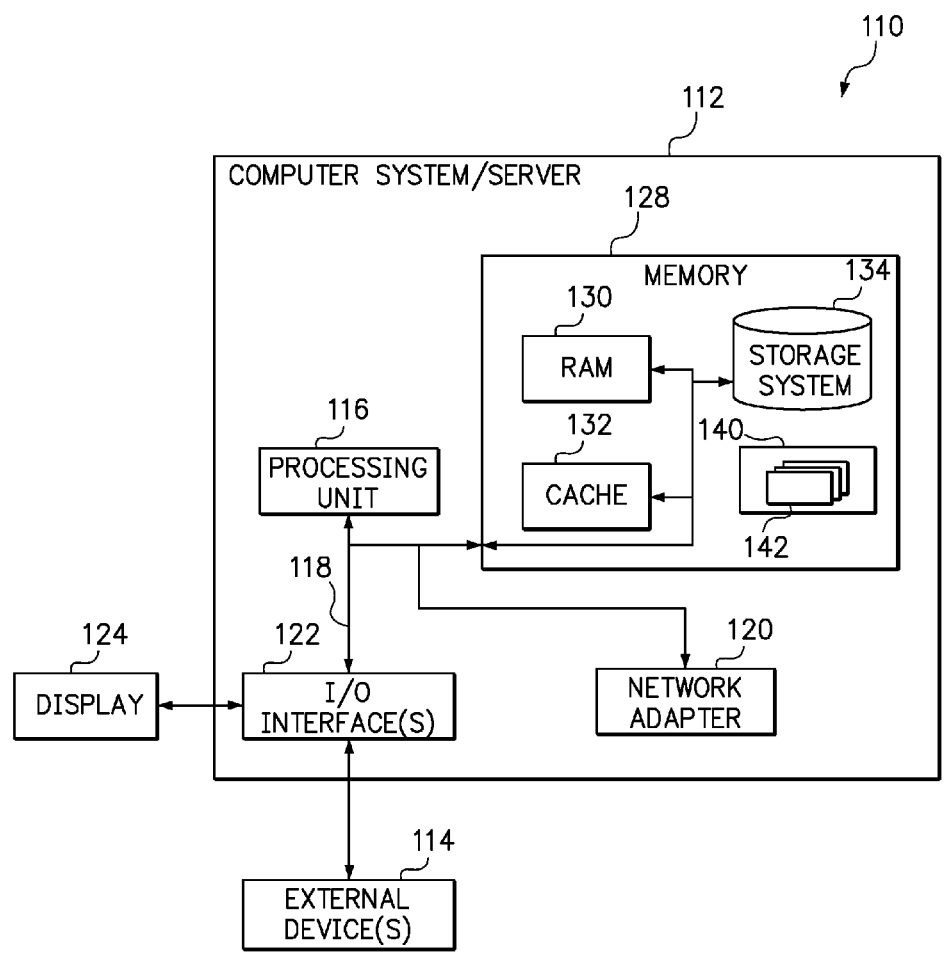
FIG. 3 is a diagram of a cloud computing node according to one or more embodiment of the present invention.

Referring now to FIG. 3, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 112 in cloud computing node 110 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 4:
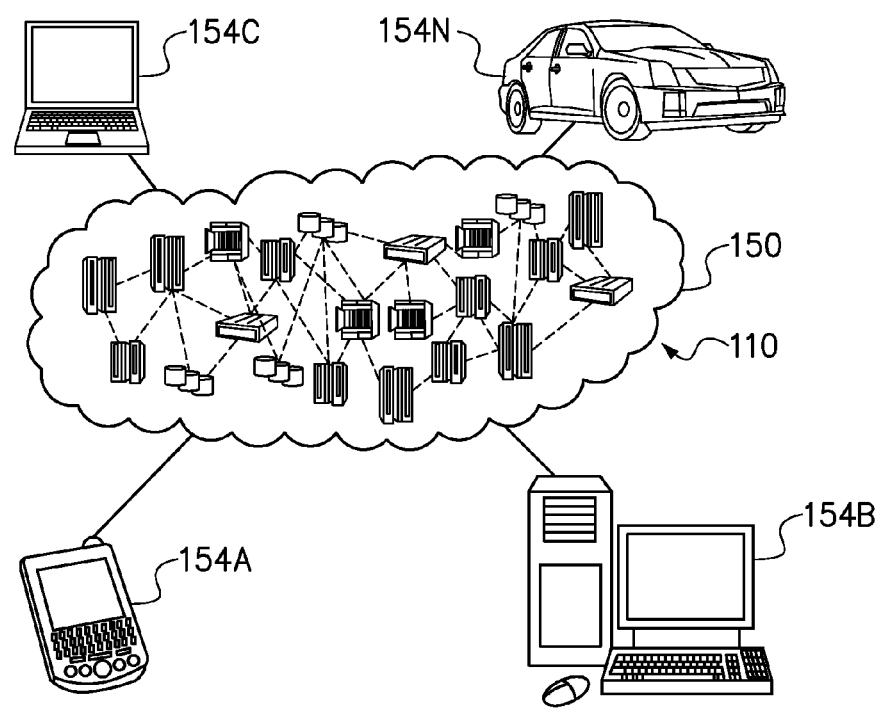
FIG. 4 is a diagram of a cloud computing environment according to one or more embodiment of the present invention.

Referring now to FIG. 4, an illustrative cloud computing environment 150 is depicted. As shown, the cloud computing environment 150 comprises one or more cloud computing nodes 110 with which local computing devices used by cloud consumers, such as, for example, personal digital assistant (PDA) or cellular telephone 154A, desktop computer 154B, laptop computer 154C, and/or automobile computer system 154N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 154A-N shown in FIG. 4 are intended to be illustrative only and that computing nodes 110 and cloud computing environment 150 can communicate with any type of computerized device over any type of network and/or network addressable connection (e.g., using a web browser).

Figure 5:
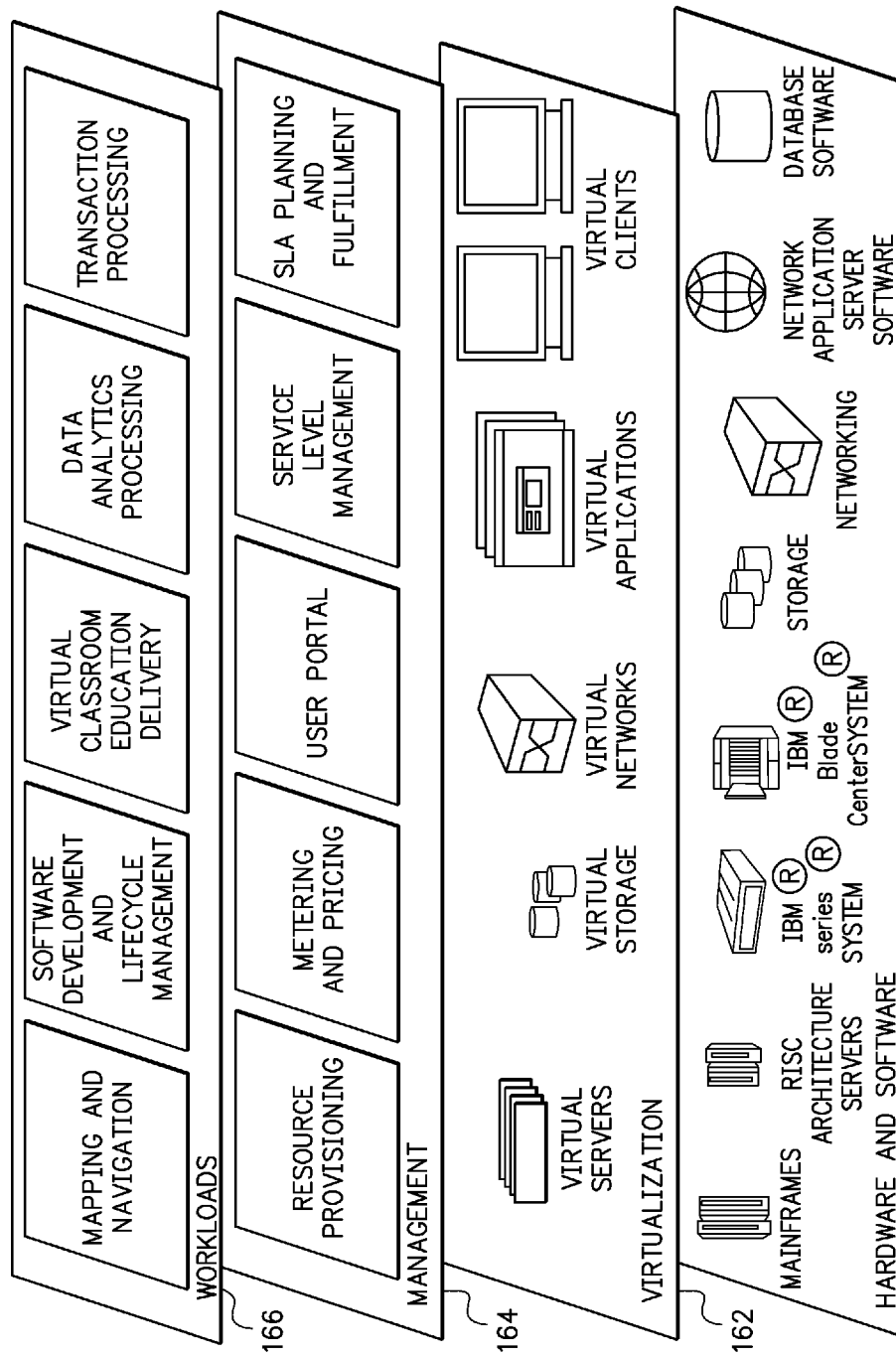
FIG. 5 is a diagram depicting abstraction model layers according to one or more embodiment of the present invention.

Referring now to FIG. 5, a set of functional abstraction layers provided by cloud computing environment 150 (Shown in FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 162 provides an abstraction layer from which the following examples of virtual entities may be provided: virtual servers; virtual storage; virtual networks, including virtual private networks; virtual applications and operating systems; and virtual clients.

In one example, management layer 164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 166 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 6:
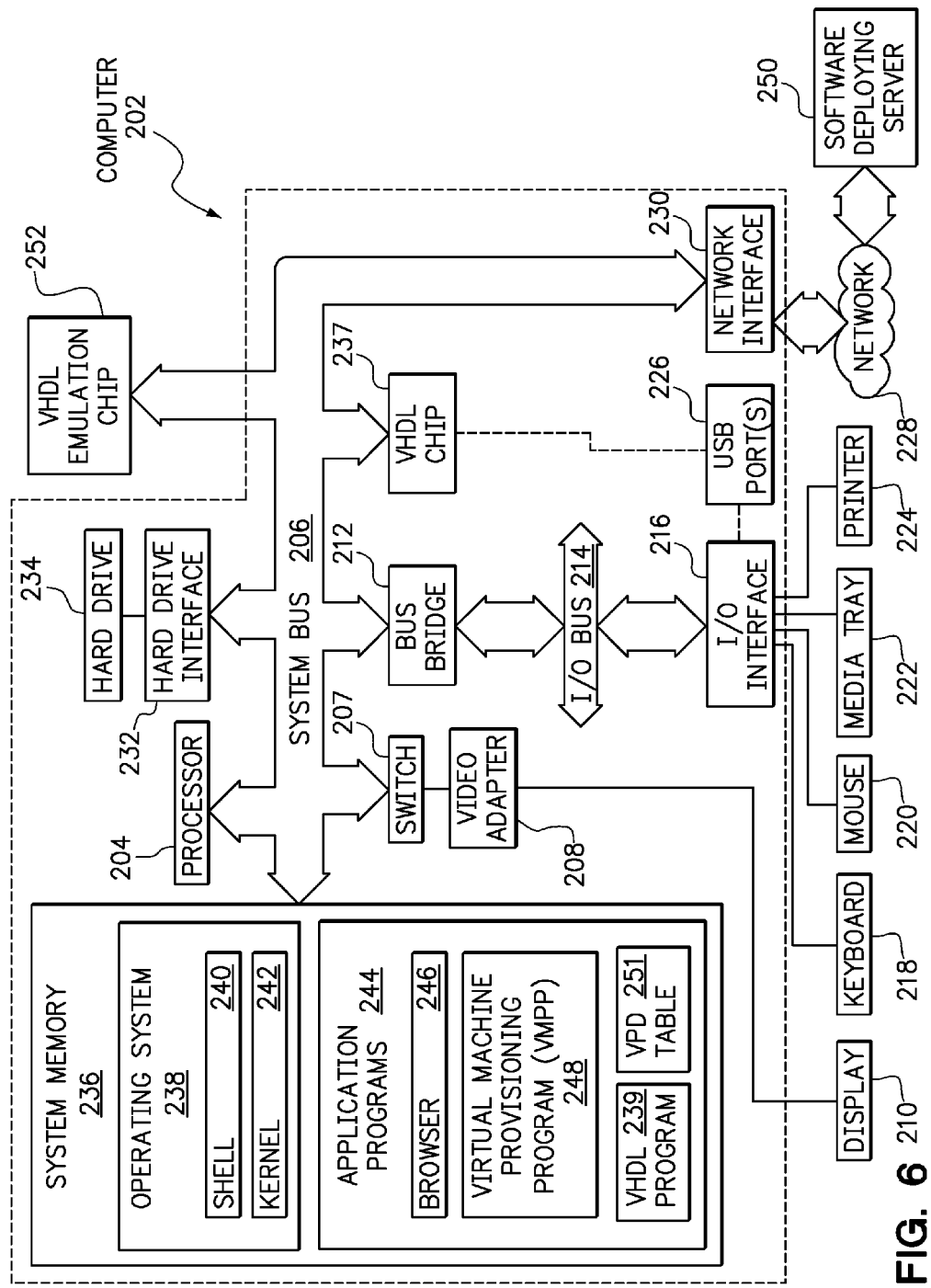
FIG. 6 is a diagram of an exemplary computing node that may be utilized according to one or more embodiments of the present invention.

FIG. 6 depicts an exemplary computing node (or simply "computer") 202 that may be utilized in accordance with one or more embodiments of the present invention. Note that some or all of the exemplary architecture, including both depicted hardware and software, shown for and within computer 202 may be utilized by the software deploying server 250, as well as the provisioning manager/management node 222 and the server blades 304a-n shown in FIG. 7. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 202 includes a processor unit 204 that is coupled to a system bus 206. Processor unit 204 may utilize one or more processors, each of which has one or more processor cores. A video adapter 208, which drives/supports a display 210, is also coupled to system bus 206. In one embodiment, a switch 207 couples the video adapter 208 to the system bus 206. Alternatively, the switch 207 may couple the video adapter 208 to the display 210. In either embodiment, the switch 207 is a switch, preferably mechanical, that allows the display 210 to be coupled to the system bus 206, and thus to be functional only upon execution of instructions (e.g., virtual machine provisioning program—VMPP 248 described below) that support the processes described herein.

System bus 206 is coupled via a bus bridge 212 to an input/output (I/O) bus 214. An I/O interface 216 is coupled to I/O bus 214. I/O interface 216 affords communication with various I/O devices, including a keyboard 218, a mouse 220, a media tray 222 (which may include storage devices such as CD-ROM drives, multi-media interfaces, etc.), a printer 224, and (if a VHDL chip 237 is not utilized in a manner described below), external USB port(s) 226. While the format of the ports connected to I/O interface 216 may be any known to those skilled in the art of computer architecture, in a preferred embodiment some or all of these ports are universal serial bus (USB) ports.

As depicted, computer 202 is able to communicate with a software deploying server 250 via network 228 using a network interface 230. Network 228 may be an external network such as the Internet, or an internal network such as an Ethernet or a virtual private network (VPN).

A hard drive interface 232 is also coupled to system bus 206. Hard drive interface 232 interfaces with a hard drive 234. In a preferred embodiment, hard drive 234 populates a system memory 236, which is also coupled to system bus 206. System memory is defined as a lowest level of volatile memory in computer 202. This volatile memory includes additional higher levels of volatile memory (not shown), including, but not limited to, cache memory, registers and buffers. Data that populates system memory 236 includes computer 202's operating system (OS) 238 and application programs 244.

The operating system 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a renderer, shown in exemplary manner as a browser 246. Browser 246 includes program modules and instructions enabling a world wide web (WWW) client (i.e., computer 202) to send and receive network messages to the Internet using hypertext transfer protocol (HTTP) messaging, thus enabling communication with software deploying server 250 and other described computer systems.

Application programs 244 in the system memory of computer 202 (as well as the system memory of the software deploying server 250) also include a virtual machine provisioning program (VMPP) 248. VMPP 248 is able to communicate with a vital product data (VPD) table 251, which provides required VPD data described below. In one embodiment, the computer 202 is able to download VMPP 248 from software deploying server 250, including in an on-demand basis.

Also stored in the system memory 236 is a VHDL (VHSIC hardware description language) program 239. VHDL is an exemplary design-entry language for field programmable gate arrays (FPGAs), application specific integrated circuits (ASICs), and other similar electronic devices. In one embodiment, execution of instructions from VMPP 248 causes the VHDL program 239 to configure the VHDL chip 237, which may be an FPGA, ASIC, or the like.

In another embodiment of the present invention, execution of instructions from VMPP 248 results in a utilization of VHDL program 239 to program a VHDL emulation chip 251. VHDL emulation chip 251 may incorporate a similar architecture as described above for VHDL chip 237. Once VMPP 248 and VHDL program 239 program VHDL emulation chip 251, VHDL emulation chip 251 performs, as hardware, some or all functions described by one or more executions of some or all of the instructions found in VMPP 248. That is, the VHDL emulation chip 251 is a hardware emulation of some or all of the software instructions found in VMPP 248. In one embodiment, VHDL emulation chip 251 is a programmable read only memory (PROM) that, once burned in accordance with instructions from VMPP 248 and VHDL program 239, is permanently transformed into a new circuitry that performs the functions needed to perform the processes of the present invention.

The hardware elements depicted in computer 202 are not intended to be exhaustive, but rather are representative to highlight essential components required by the present invention. For instance, computer 202 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned a virtual machine (VM) somewhere in the computing cloud. This virtual machine provides the software operating system and physical resources such as processing power and memory to support the user's application workload. The present disclosure describes methods for dynamically migrating virtual machine among physical servers based on the cache demand of the virtual machine workload. As described above, one of those methods comprises obtaining a cache hit ratio for each of a plurality of virtual machines; identifying, from among the plurality of virtual machines, a first virtual machine having a cache hit ratio that is less than a threshold ratio, wherein the first virtual machine is running on a first physical server; and migrating the first virtual machine from the first physical server having a first cache size to a second physical server having a second cache size that is greater than the first cache size.

Figure 7:
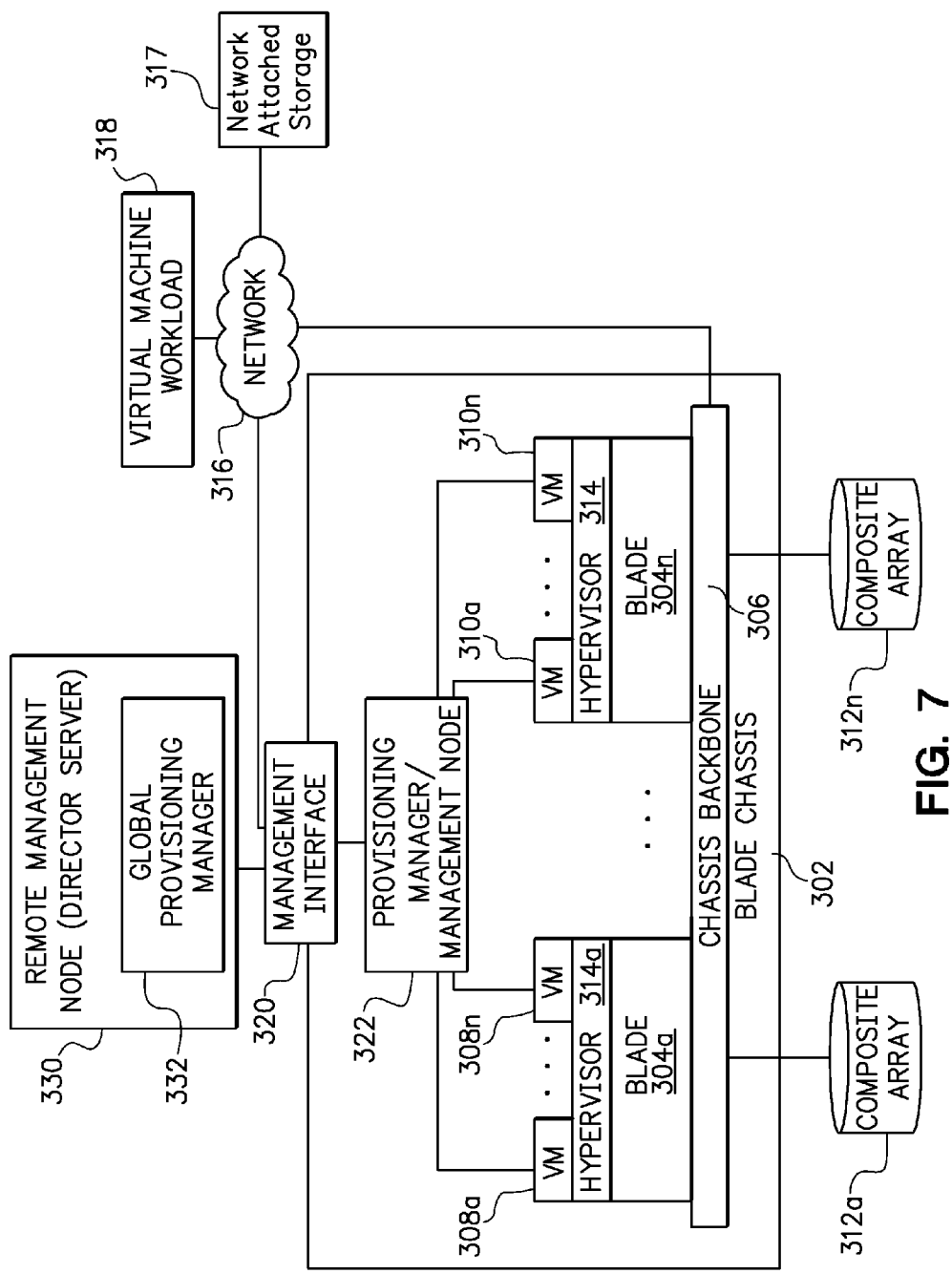
FIG. 7 is a diagram of an exemplary blade chassis that may be utilized according to one or more embodiments of the present invention.

FIG. 7 depicts an exemplary blade chassis that may be utilized in accordance with one or more embodiments of the present invention. The exemplary blade chassis 302 may operate in a "cloud" environment to provide a pool of resources. Blade chassis 302 comprises a plurality of blades 304a-n (where "a-n" indicates an integer number of blades) coupled to a chassis backbone 306. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 7, blade 304a supports VMs 308a-n (where "a-n" indicates an integer number of VMs), and blade 304n supports VMs 310a-n (wherein "a-n" indicates an integer number of VMs). The blades 304a-n are coupled to a storage device 312 that provides a hypervisor 314, guest operating systems, and applications for users (not shown). Provisioning software from the storage device 312 allocates boot storage within the storage device 312 to contain the maximum number of guest operating systems, and associates applications based on the total amount of storage (such as that found within storage device 312) within the cloud. For example, support of one guest operating system and its associated applications may require 1 GByte of physical memory storage within storage device 312 to store the application, and another 1 GByte of memory space within storage device 312 to execute that application. If the total amount of memory storage within a physical server, such as boot storage device 312, is 64 GB, the provisioning software assumes that the physical server can support 32 virtual machines. This application can be located remotely in the network 316 and transmitted from the network attached storage 317 to the storage device 312 over the network. The global provisioning manager 332 running on the remote management node (Director Server) 330 performs this task. In this embodiment, the computer hardware characteristics are communicated from the VPD 251 to the VMPP 248. The VMPP 248 communicates the computer physical characteristics to the blade chassis provisioning manager 322, to the management interface 320, and to the global provisioning manager 332 running on the remote management node (Director Server) 330.

Note that chassis backbone 306 is also coupled to a network 316, which may be a public network (e.g., the Internet), a private network (e.g., a virtual private network or an actual internal hardware network), etc. Network 316 permits a virtual machine workload 318 to be communicated to a management interface 320 of the blade chassis 302. This virtual machine workload 318 is a software task whose execution, on any of the VMs within the blade chassis 302, is to request and coordinate deployment of workload resources with the management interface 320. The management interface 320 then transmits this workload request to a provisioning manager/management node 322, which is hardware and/or software logic capable of configuring VMs within the blade chassis 302 to execute the requested software task. In essence the virtual machine workload 318 manages the overall provisioning of VMs by communicating with the blade chassis management interface 320 and provisioning management node 322. Then this request is further communicated to the VMPP 148 in the computer system. Note that the blade chassis 302 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a tangible computer usable storage medium, the computer program product comprising:
    computer usable program code for detecting an increase in an amount of instability in a first computer system;
    computer usable program code for comparing a first set of software applications installed on the first computer system to each set of software applications installed on a plurality of other computer systems in communication with a management module;
    computer usable program code for identifying a second computer system from among the plurality of other computer systems, wherein the set of software applications installed on the second computer system includes all of the first set of software applications except for a given software application; and
    computer usable program code for identifying the given software application as the cause of the increase in the amount of instability in the first computer system.

2. The computer program product of claim 1, wherein the first computer system and the plurality of other computer systems are virtual machines that share a common configuration profile.

3. The computer-implemented method of claim 1, wherein the first computer system and the plurality of other computer systems are physical machines that share a common configuration profile.

4. The computer program product of claim 2, further comprising:
    computer usable program code for removing the identified software application from the first computer system.

5. The computer program product of claim 1, wherein the first computer system and the plurality of other computer systems are managed by the same management module.

6. The computer program product of claim 5, further comprising:
    computer usable program code for the management module communicating with at least one other management module to share data identifying a set of software applications installed on each computer system, wherein each of the at least one other management module manages a plurality of computer systems.

7. The computer program product of claim 1, wherein the first computer system and the plurality of other computer systems are virtual machines.

8. The computer program product of claim 1, wherein the first computer system and the plurality of other computer systems are virtual machines cloned from the same virtual machine template.

9. A computer program product including computer usable program code embodied on a tangible computer usable storage medium, the computer program product comprising:
    computer usable program code for detecting an increase in an amount of stability in a first computer system;
    computer usable program code for comparing a first set of software applications installed on the first computer system to each set of software applications installed on a plurality of other computer systems in communication with a management module;

computer usable program code for identifying a second computer system from among the plurality of other computer systems, wherein the set of software applications installed on the second computer system includes all of the first set of software applications except for a given software application; and computer usable program code for identifying the given software application as the cause of the increase in the amount of stability in the first computer system.

10. The computer program product of claim 9, wherein the first computer system and the plurality of other computer systems are physical machines that share a common configuration profile.

11. The computer program product of claim 1, wherein the identified software application is an update to a driver or firmware.

12. The computer program product of claim 1, wherein the identified software application is an updated version of a previously installed software application.

13. The computer program product of claim 1, wherein the identified software application includes a driver for a hard disk drive, a network interface, or an input/output port.

14. The computer program product of claim 1, further comprising:

computer usable program code for installing an updated version of the identified software application to the first computer system, wherein the first computer system and the plurality of other computer systems are virtual machines.

15. The computer program product of claim 1, further comprising:

computer usable program code for removing the identified software application from the first computer system.

16. The computer program product of claim 15, wherein the first computer system and the plurality of other computer systems are virtual machines.

17. The computer program product of claim 15, further comprising:

computer usable program code for removing the identified software application from at least one of the plurality of other computer systems.

18. The computer program product of claim 9, wherein the first computer system and the plurality of other computer systems are virtual machines that share a common configuration profile.

19. The computer program product of claim 9, further comprising:

computer usable program code for installing the identified software application to at least one of the plurality of other computer systems.

20. The computer program product of claim 9, wherein the first computer system and the plurality of other computer systems are managed by the same management module.

* * * * *